(12) United States Patent
Ono et al.

(10) Patent No.: US 6,575,874 B2
(45) Date of Patent: Jun. 10, 2003

(54) WORKING VEHICLE

(75) Inventors: Hiroyuki Ono, Tokyo (JP); Yasuhiko Miyamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,165

(22) Filed: Sep. 17, 2001

(65) Prior Publication Data

US 2002/0035008 A1 Mar. 21, 2002

(30) Foreign Application Priority Data

Sep. 18, 2000 (JP) .................................... 2000-282713
Sep. 18, 2000 (JP) .................................... 2000-282714
Sep. 13, 2001 (JP) .................................... 2001-278100

(51) Int. Cl.$^7$ ............................ F16H 59/48; B60K 41/12
(52) U.S. Cl. ..................... 477/120; 477/901; 477/37
(58) Field of Search ............................ 477/37, 43, 115, 477/120, 901, 904

(56) References Cited

U.S. PATENT DOCUMENTS

| | | | | |
|---|---|---|---|---|
| 3,881,368 A | * | 5/1975 | Furuhashi et al. | 477/901 X |
| 4,742,733 A | * | 5/1988 | Schreiner | 477/120 |
| 4,854,194 A | * | 8/1989 | Kaneko et al. | 477/901 X |
| 5,035,160 A | * | 7/1991 | Morita | 477/904 X |
| 5,728,026 A | * | 3/1998 | Sakaguchi et al. | 477/120 X |
| 5,913,746 A | * | 6/1999 | Bauerle | 477/901 X |
| 5,941,793 A | * | 8/1999 | Ito et al. | 477/120 |
| 6,098,004 A | * | 8/2000 | Grytzelius et al. | 477/120 X |
| 6,106,434 A | * | 8/2000 | Ibamoto et al. | 477/120 |
| 6,368,247 B1 | * | 4/2002 | Kondo | 477/120 X |
| 6,427,108 B1 | * | 7/2002 | Kanasugi et al. | 477/120 X |

* cited by examiner

Primary Examiner—Richard M. Lorence
Assistant Examiner—Roger Pang
(74) Attorney, Agent, or Firm—McGinn & Gibb, PLLC

(57) ABSTRACT

A working vehicle for work such as a turf grass management is provided, which has an improved climb-up performance and an improved engine-break force at a stage of climbing down a slope. The working vehicle mounts a working machine driven by an engine and also a continuously variable transmission thereon, and has a climb-up or climb-down mode Df which sets a transmission ratio of the continuously variable transmission at a maximum value during travel of a slope. The climb-up or climb-down mode Df is selected by an operation of a shift lever or automatically detected by climb-up or climb-down detectors. When the mode Df is set, a pulley ratio of the continuously variable transmission is controlled so as to have the maximum transmission ratio based on a command signal of a control unit.

19 Claims, 11 Drawing Sheets

WORKING VEHICLE

BACKGROUND OF THE INVENTION

The present invention relates to a working vehicle suitable for a turf grass management working vehicle used for work such as fertilizing, chemicals spraying, lawn mowing and the like in golf courses.

In the golf courses and parks, the working vehicle, also called turf grass management working vehicle, is used to grow turf grass. With such vehicles, various types of works such as the fertilizing, spreading topdressing, the spraying chemicals, aerating soil by injecting air, or clearing tree leaves by using a blower are conducted. The various types of works are carried out with attachments, appropriate for the types of works, mounted on a bed of the working vehicle.

Recently, a working vehicle with an automatic transmission is on the increase from viewpoints of a smoothly starting, comfortable traveling performance, and an easy driving operation. Such vehicle with the automatic transmission has travel modes such as "Parking (P)", "Rear Drive (R)", "Neutral (N)" and "Drive (D)", which are appropriately selected with a shift lever by a driver. A shift from a vehicle start to a maximum speed thereof is carried out only by an operation of accelerator through selecting the Drive mode, i.e., a position (D) of the shift lever.

However, the Drive mode has the following problems. That is, although a shift control under the Drive mode sufficently acts on a flat road, that on a slope is not always sufficient, for example, there are some problems in a climb-up performance of a heavy vehicle or an engine-brake peformance when climbing down a slope. In other words, at a stage os starting to climb up a slope, a transmission ratio is relatively low in geleral, and so vehicle speed during the climb-up is apt to become low. Then, a kick down for increasing the transmisison ratio often occurs by an operation of a driver, thereby there exists a problem that a travel stability of the working vehicle may be lost. Also, when climbing down the slope, the transmission ratio lowers as the vehicle speed of the working vehicle increases, thereby lowering the performance of the engine brake. As a result, there exists a problem that a foot brake must be operated in order to reduce the vehicle speed, which may cause injury of turf grass.

In particular, when spraying the chemicals, a vehicle weight may be over 2,000 kg under the condition in which a tank is filled with chemicals, wherein if the function of engine brake is weak at the climb-down stage, the friver can not avoid using the foot brake since it is difficult to control the vehicle speed. However, if the foot brake is depressed hard in order to supplement a brake force, there is a danger that wheels may be locked to injure turf grass.

In particular, when spraying the chemicals, a vehicle weight may be over 2,000 kg under the condition in which a tank is filled with chemicals, wherein if the function of engine break is weak at the climb-down stage, the driver can not avoid using the foot break since it is difficult to control the vehicle speed. However, if the foot break is depressed hard in order to supplement a break force, there is a danger that wheels may be locked to injure turf grass.

SUMMARY OF THE INVENTION

An object of the present invention is to provide a working vehicle with an increased climb-up performance at a stage of climbing up a slope and an increased engine-brake force at a stage of climbing down a slope so as to improve travel stability thereof and also keep a good condition of turf grass.

Furthermore, another object of the present invention is to provide the working vehicle in which the climb-up performance and the engine-brake force at the stage of climb-down is automatically controlled, thereby enabling the vehicle to be driven only by an operation of an accelerator at any place without a manual operation of transmission.

The working vehicle of the present invention has a working machine and comprises an engine, an automatic transmission for transmitting a power of the engine to wheels, and control means for controlling a transmission ratio of the automatic transmission unique to a climb-up mode or a climb-down mode when the control means determines that the working vehicle is in the climb-up mode or the climb-down mode.

According to the present invention, the working vehicle can climb up a slope maintaining the engine speed even at a stage of climbing up the slope since the transmission ratio on the slope is controlled with the transmission ratio unique to the climb-up mode, thereby enabling the climbing-up traveling to be stable. Further, when climbing down the slope also, the working vehicle is controlled with the transmission ratio unique to the climb-down mode, so that a stable engine brake force can be obtained. Consequently, not only increase of vehicle speed at a stage of climbing down, but also injury of turf grass due to a quick operation of a foot-brake device can be prevented. In other words, the safety at a time of climbing down can be improved.

According to the working vehicle of the present invention, the control means may be arranged to control the transmission ratio of the automatic transmission at a maximum value when it is determined that the working vehicle is in the climb-up mode or the climb-down mode.

In accordance with the present invention, the working vehicle can climb up the slope with high engine speed, and climb down with a large engine-break force.

Further, according to the working vehicle of the present invention, the control means may be arranged to control the transmission ratio of the automatic transmission through a normal control table when determining that the working vehicle is in a normal travel mode, and through a climb-up control table or a climb-down control table when determining that the working vehicle is in a climb-up mode or a climb-down mode, respectively.

Also, preferably, the control means determines that the working vehicle is in either the climb-up mode or the climb-down mode when the control means detects that a shift lever is changed over to a predetermined position.

Further, preferably, the control means determines that the working vehicle is in the climb-up mode when an accelerator opening is at or above a predetermined value, and an acceleration of the working vehicle is at or below a predetermined value.

Moreover, the control means determines that the working vehicle is in the climb-down mode when an accelerator opening is at or below the predetermined value, and an acceleration of the working vehicle is at or above the predetermined value.

In accordance with the present invention, since just the already existing data showing the driving condition of vehicle are employed for determining a travel mode, no addition of parts for determination of the climb-up or down mode is needed.

In addition, preferably, the control means determines that the working vehicle is in either the climb-up mode or the climb-down mode when an absolute value of an inclined angle of the working vehicle as detected by an inclination sensor is at or above a predetermined value.

In accordance with the present invention, since the inclination sensor directly detects the inclined amount of vehicle to control the transmission ratio, the working vehicle can automatically and quickly conduct a changeover to the climb-up or climb-down mode without influence of unsteady accelerator operation by an operator.

The automatic transmission of the present invention may be a continuously variable transmission, thereby enabling the shift control to be smoothly and steplessly conducted.

BRIEF DESCRIPTION OF THE DRAWINGS

These and other objects and advantages of the present invention will become clearly understood from the following description with reference to the accompanying drawings, wherein:

FIG. 12a is a shift characteristics diagram showing a relationship between engine speed and vehicle speed in a modified climb up or down mode.

FIG. 12b is a shift characteristics diagram showing a relationship between vehicle speed and transmission ratio in the modified climb up or down mode of FIG. 12a.

DETAILED DESCRIPTION OF THE PREFERRED EMBODIMENTS

Figure 1:
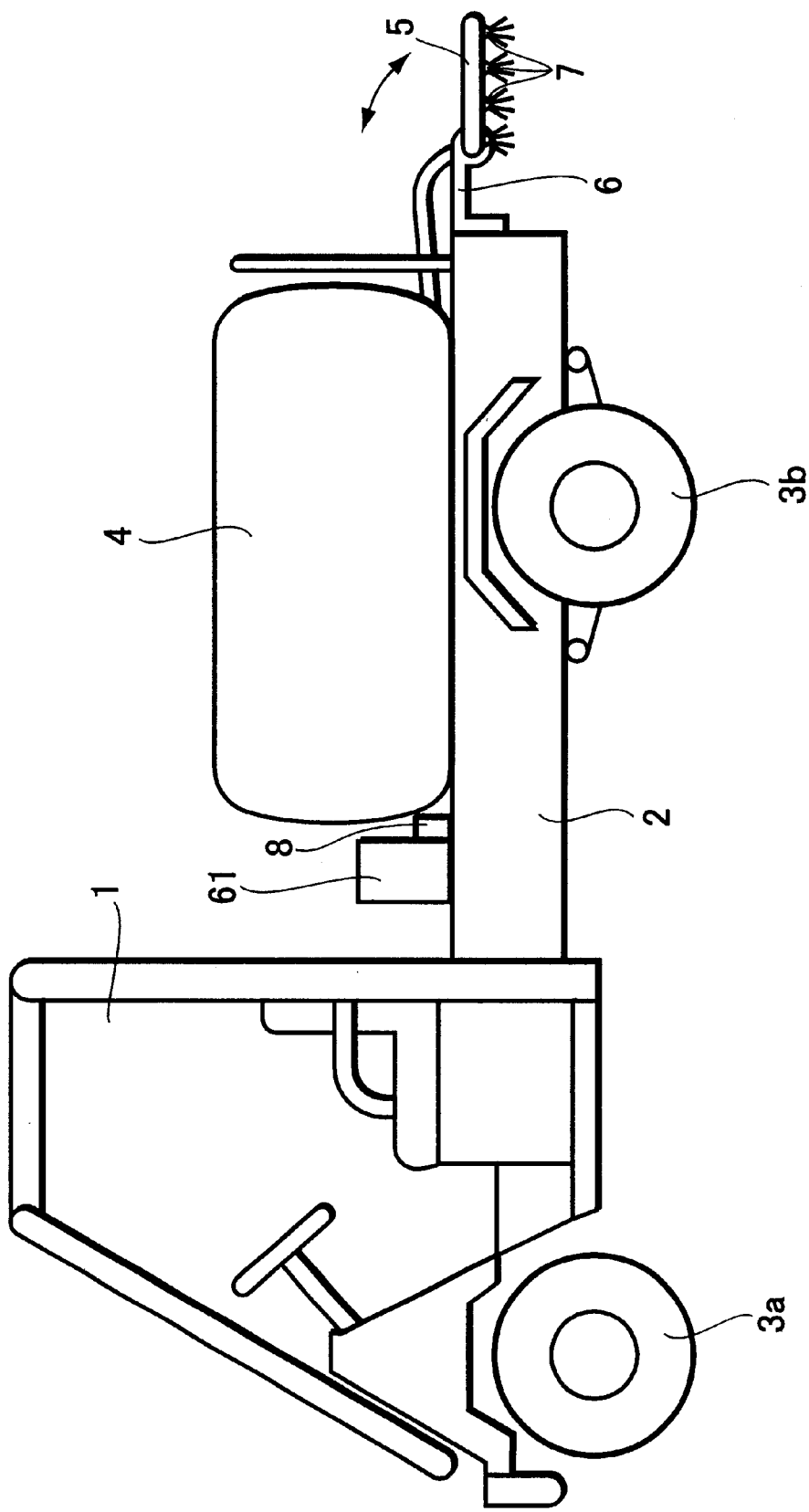
FIG. 1 is a side view showing a working vehicle of the first embodiment of the present invention.

The details of preferred embodiments of the present invention will be described below referring to the drawings.

Figure 2:
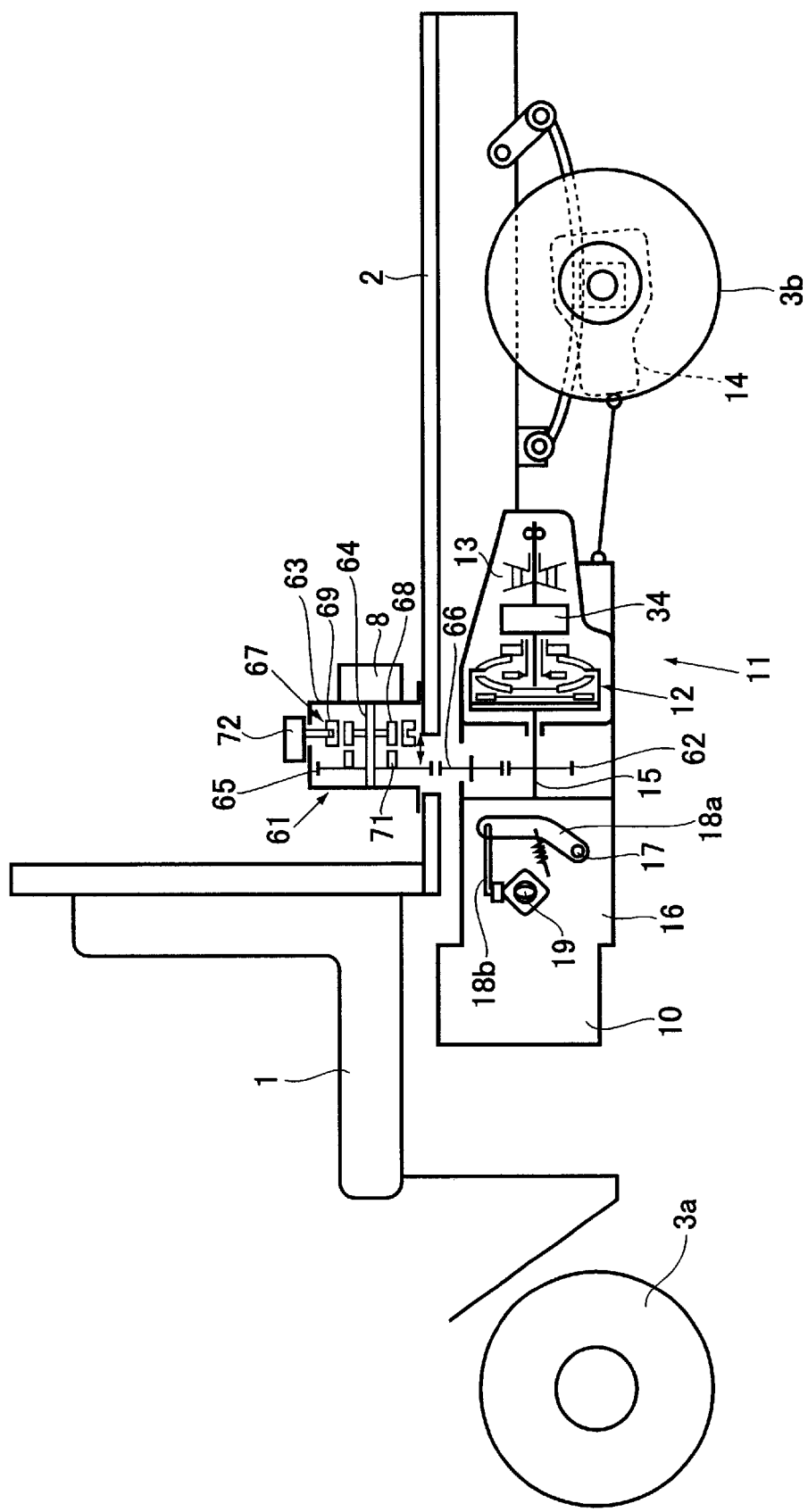
FIG. 2 is an enlarged side view showing a power transmitting flow of the working vehicle in FIG. 1.
Figure 3:
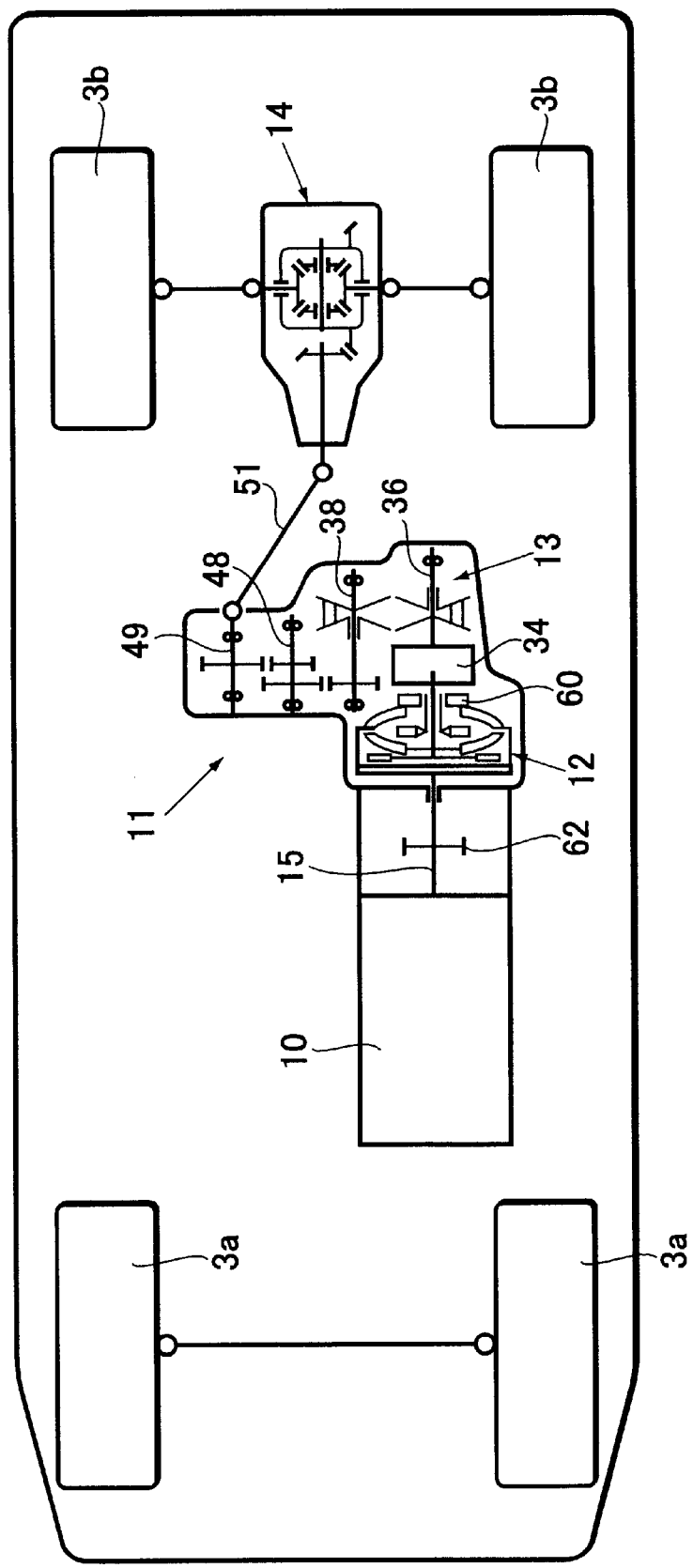
FIG. 3 is a plan view showing the power transmitting flow line of the working vehicle in FIG. 1.

FIG. 1 is a side view of a working vehicle of the first embodiment of the present invention, FIG. 2 is an enlarged side view showing a power transmitting flow line of the working vehicle in FIG. 1, and FIG. 3 is a plan view showing the power transmitting flow line in FIG. 2.

The working vehicle of the first embodiment is provided with an operator's seat 1 in a front part and a bed 2 in a rear part, and a pair of front wheels 3a and a pair of rear wheels 3b are provided. It is so arranged that any of a plurality of attachments can be detachably mounted on the bed 2 depending on the kind of works. FIG. 1 shows a state in which a chemical tank 4 is mounted on the bed 2 for spraying the chemicals (liquid chemical) over the turf grass of a golf course.

A spray pipe 5 is fitted to the bed 2 by a holder 6. The spray pipe 5 is rotatable, with respect to the holder 6, as indicated by the arrows, and the spray pipe can either be positioned horizontally, as shown, or in a folded state. A plurality of spray nozzles 7 are provided on the spray pipe 5, and the chemicals in the chemical tank 4 are sprayed from the spray nozzles 7 by driving a working pump 8.

When spraying grainy fertilizers over the turf grass of the golf course by the working vehicle, a scraper with a hopper filled with the fertilizer is fitted to the bed 2, and when spreading soil and sand or topdressing, each one is putted into the hopper. When fertilizer or soil and sand in the hopper is to be spread by the scraper, a hydraulic pump is installed as the pump 8, and a spreading device provided on the scraper is driven by a hydraulic motor with hydraulic oil discharged from the hydraulic pump.

When working at high positions by using the working vehicle, a lifter driven by the hydraulic motor is fitted on the bed 2. Also, when pumping air into soil to activate turf grass, aerating nozzles for discharging compressed air supplied from an air pump are fitted on the bed 2. Furthermore, when smoothing off the soil and sand spread over the ground, a rake which is oscillated by the hydraulic motor is fitted on the bed 2.

As shown in FIG. 2 and FIG. 3, for driving the working vehicle, power from an engine 10 is transmitted to drive wheels through a power transmitting mechanism 11. The power transmitting mechanism 11 has a torque converter 12, an automatic transmission 13, and a differential device 14.

As shown in FIG. 3, because the working vehicle has the rear wheels 3b as drive wheels, the differential device 14 is provided for the rear wheels. However, the front wheels 3a or both the front and rear wheels 3a, 3b can be the drive wheels. Since both the front wheels 3a and the rear wheels 3b are for the working vehicle designed for the off-road use which can travel on the turf grass, the aforementioned wheels are wider in width than ordinary wheels.

The engine 10 is provided with a well-known mechanical type engine governor device as an engine speed regulating mechanism for constantly regulating the engine speed without being influenced by load fluctuations. As shown in FIG. 2, a governor shaft 17 of the engine governor device is provided in a crank case 16 having a crank shaft 15, which is rotated through a reciprocating movement of a piston, therein. The governor shaft 17 is connected to a throttle valve 19 through a governor lever 18a and a governor rod 18b. In general, when an engine load is lowered, the engine speed has a tendency to be temporally increased by the lowered amount of load. However, since the engine 10 of the present invention is provided with the governor device, the governor lever 18a is rotated in a direction of a lower speed side thereof to close the throttle valve 19 by the rotation amount even if the engine load is lowered. Therefore, the engine speed can be constantly regulated without being influenced by the load fluctuations.

Figure 4:
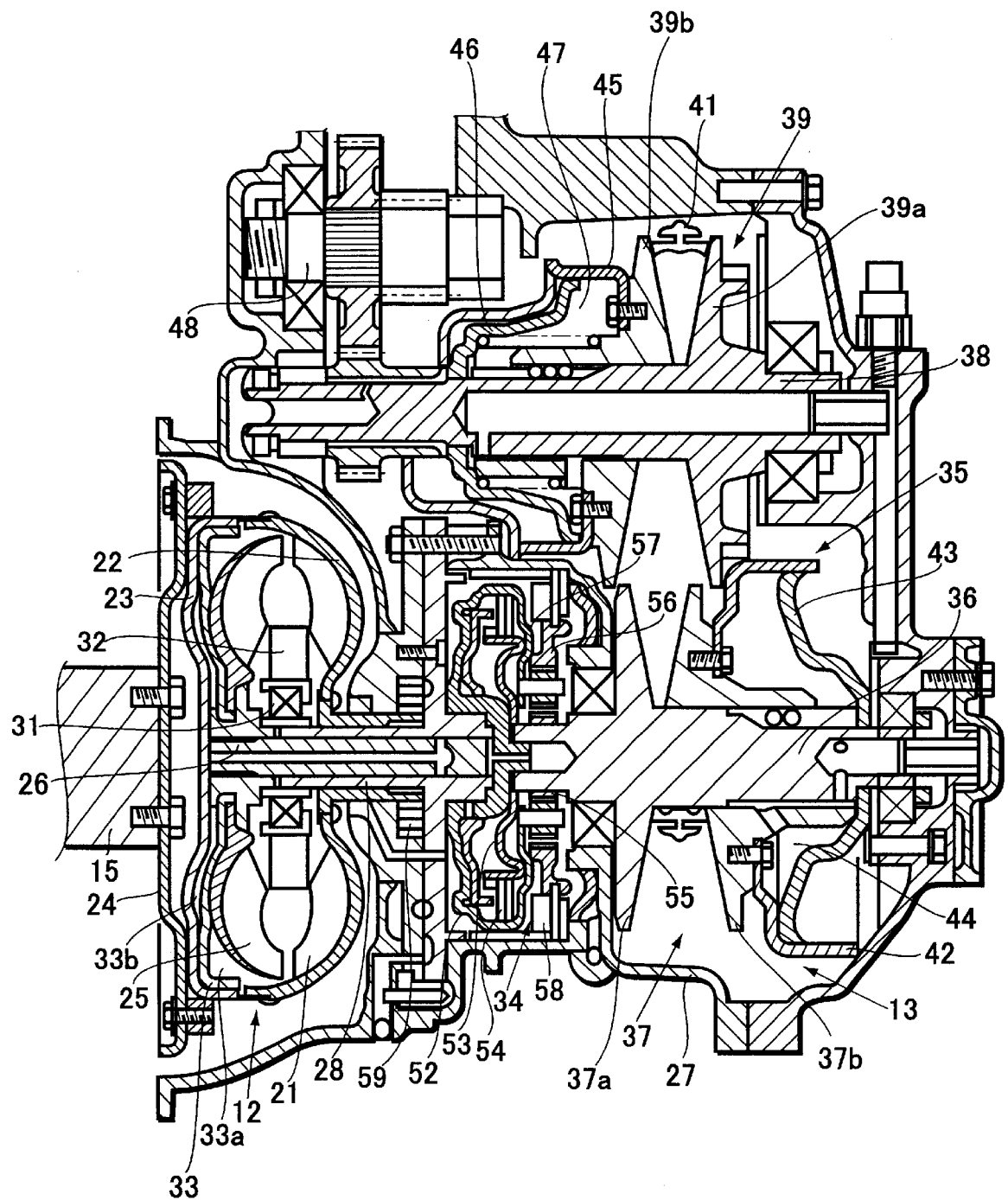
FIG. 4 is an enlarged cross sectional view showing a torque converter and an automatic transmission.

FIG. 4 is an enlarged sectional view showing the torque converter 12 and the automatic transmission 13. The torque converter 12 is connected to the crankshaft 15 of the engine 10. The torque converter 12 has a pump-side case 22 provided with a pump impeller 21 and a front cover 23 fixed to the pump-side case 22. The front cover 23 is fixed to the crankshaft 15 through a drive plate 24. A turbine runner 25, arranged facing the pump impeller 21, is fixed to a turbine shaft 26, and the turbine shaft 26 is rotatably putted in a hollow supporting shaft 28 which is fixed to a transmission case 27. On the supporting shaft 28, a stator 32 is mounted through a one-way clutch 31.

A lock-up clutch 33 is fitted to the turbine shaft 26 and engaged with the front cover 23. On one side of the lock-up clutch 33 is an application chamber 33a and on the other side thereof is a release chamber 33b. Therefore, the torque converter 12 is operated by the hydraulic oil supplied to the release chamber 33b circulated through the application chamber 33a, and the torque converter 12 proceeds to a lock-up state when the pressure in the release chamber 33b is lowered by supplying hydraulic oil to the application chamber 33a and thereby the lock-up clutch 33 is connected to the front cover 23. Thus the power of the crankshaft 15 is transmitted to the turbine shaft 26 through the torque converter 12 or the lock-up clutch 33.

The automatic transmission 13 is a continuously variable transmission, in which the rotation of the turbine shaft 26 is transmitted to a primary shaft 36 of a continuously variable transmission 35 through a forward-reverse changeover device 34. The primary shaft 36 is provided with a primary pulley 37, which has a fixed pulley 37a integrally formed with the primary shaft 36, and a movable pulley 37b mounted on the primary shaft 36 in such a way that it can axially slide through a ball spline, and the like. The movable pulley 37b is positioned facing the fixed pulley 37a. The width of the groove between the pulleys is variable. A secondary shaft 38 arranged parallel to the primary shaft 36 is provided with a secondary pulley 39, which has a fixed pulley 39a integrally formed with the secondary shaft 38 and a movable pulley 39b mounted, in the same way as the movable pulley 37b, on the secondary shaft 38 facing the fixed pulley 39a so that it can axially slide. The width of the groove between the pulleys is variable as well as that of the primary shaft 36.

A belt 41 is arranged between the primary pulley 37 and the secondary pulley 39. The number of revolutions of the secondary shaft 38 can be steplessly varied by making the radii of the belt 41 on the pulleys 37 and 39 vary through the variation of the widths between both the pulleys 37 and 39. In FIG. 4, both narrowed and widened states of each groove width of the pulleys 37 and 39 are shown.

A primary oil chamber 44 is formed with a cylinder 42 fixed to the movable pulley 37b and a plunger 43 fixed to the primary shaft 36. A secondary oil chamber 47 is formed with a cylinder 45 fixed to the movable pulley 39b and a plunger 46 fixed to the secondary shaft 38. Each pulley-groove width varies by adjusting a hydraulic pressure supplied to each of the oil chambers 44 and 47.

As shown in FIG. 3, the secondary shaft 38 is connected to a first and second intermediate shafts 48 and 49 through gears. The intermediate shaft 49 is connected to the differential device 14 through a connecting shaft 51.

As shown in FIG. 4, the forward-reverse changeover device 34 has a clutch drum 52 fixed to the turbine shaft 26 and a clutch hub 53 fixed to the primary shaft 36. A multi-disk type forward clutch 54 is provided between the clutch drum 52 and the clutch hub 53. Therefore, when the forward clutch 54 is connected, the rotation of the turbine shaft 26 is transmitted to the primary shaft 36 through the clutch hub 53, and the primary shaft 36 rotates in a positive rotational direction, the same direction as that of the turbine shaft 26.

A sun gear 55 is fixed to the primary shaft 36, and on the outer periphery of the sun gear 55, a ring gear 56 is rotatably arranged. Planetary pinion gears are rotatably mounted on a carrier 57 fitted to the clutch drum 52, one of planetary pinion gears meshes with the sun gear 55 and the other meshes with internal teeth of the ring gear 56. A multi-disk type reverse brake 58 is provided between the ring gear 56 and the transmission case 27, and the sun gear 55 and the primary shaft 36 rotate in the opposite direction to the turbine shaft 26 when the reverse brake 58 is putted in a braking state with the forward clutch 54 disengaged.

A hydraulic pump 59 mounted on the transmission case 27 is driven with the engine 10 through the crankshaft 15 and a pump-side case. It is so arranged that the hydraulic oil discharged from the hydraulic pump 59 is supplied to hydraulic equipments provided on the continuously variable transmission 35.

Chemicals in the chemical tank 4 mounted on the bed 2 are to be supplied to the spray nozzles 7 by the pump 8. As shown in FIG. 2, the pump 8 is driven with a drive unit 61 mounted on the bed 2.

As shown in FIG. 2, a gear 62 is fitted on the crankshaft 15. A gear 65 is fixed on a working shaft 64, which is rotatably mounted within a unit case 63 of the drive unit 61, and meshes with the gear 62 through an intermediate gear 66. Thus, it is so arranged that the working shaft 64 is driven with the engine 10 which drives the working vehicle. The gears 62, 65, and 66 are provided to transmit the rotation of the crankshaft 15 to the working shaft 64, but it may be arranged in such a way that the power is transmitted through a chain or a belt.

A changeover clutch 67 for changing over between the states at which the working shaft 64 is connected to or disconnected from the crankshaft 15 is provided on the working shaft 64. The changeover clutch 67 has a clutch hub 68 fixed to the working shaft 64 and a clutch sleeve 69 which is axially movable on the working shaft 64 while constantly meshing with the clutch hub 68. An engaging ring 71 is fixed on the gear 65 facing the clutch sleeve 69.

A hydraulic type or electric type working actuator 72 is provided on the drive unit 61, whereby the clutch sleeve 69 is automatically operated and shifted to a state for transmitting the rotation of the crankshaft 15 to the working shaft 64 while engaging with the clutch hub 68 and the engaging ring 71, or to a state for disconnecting the power by engaging only with the clutch hub 68. In the drive unit 61 shown in FIG. 2, it is so arranged that the changeover operation between the connection of the working shaft 64 to and the disconnection thereof from the crankshaft 15 is automatically made by operating a switch at the operator's seat through the working actuator 72; however, the changeover may also be carried out manually, instead of using the working actuator, with a manual operation lever assembled with the drive unit 61.

The pump 8 is detachably mounted on the drive unit 61, and as shown in FIG. 1, when spraying the chemicals, a liquid discharging pump is mounted on the drive unit 61 as the pump 8, and when spreading the fertilizer or topdressing, a hydraulic pump to drive a hydraulic motor which is assembled to a scraper is mounted on the drive unit 61. Furthermore, a drive unit assembled with the pump 8 adapted for all the kind of works may be mounted on the bed 2 without exchanging the pump 8 depending on the kind of works.

Figure 5:
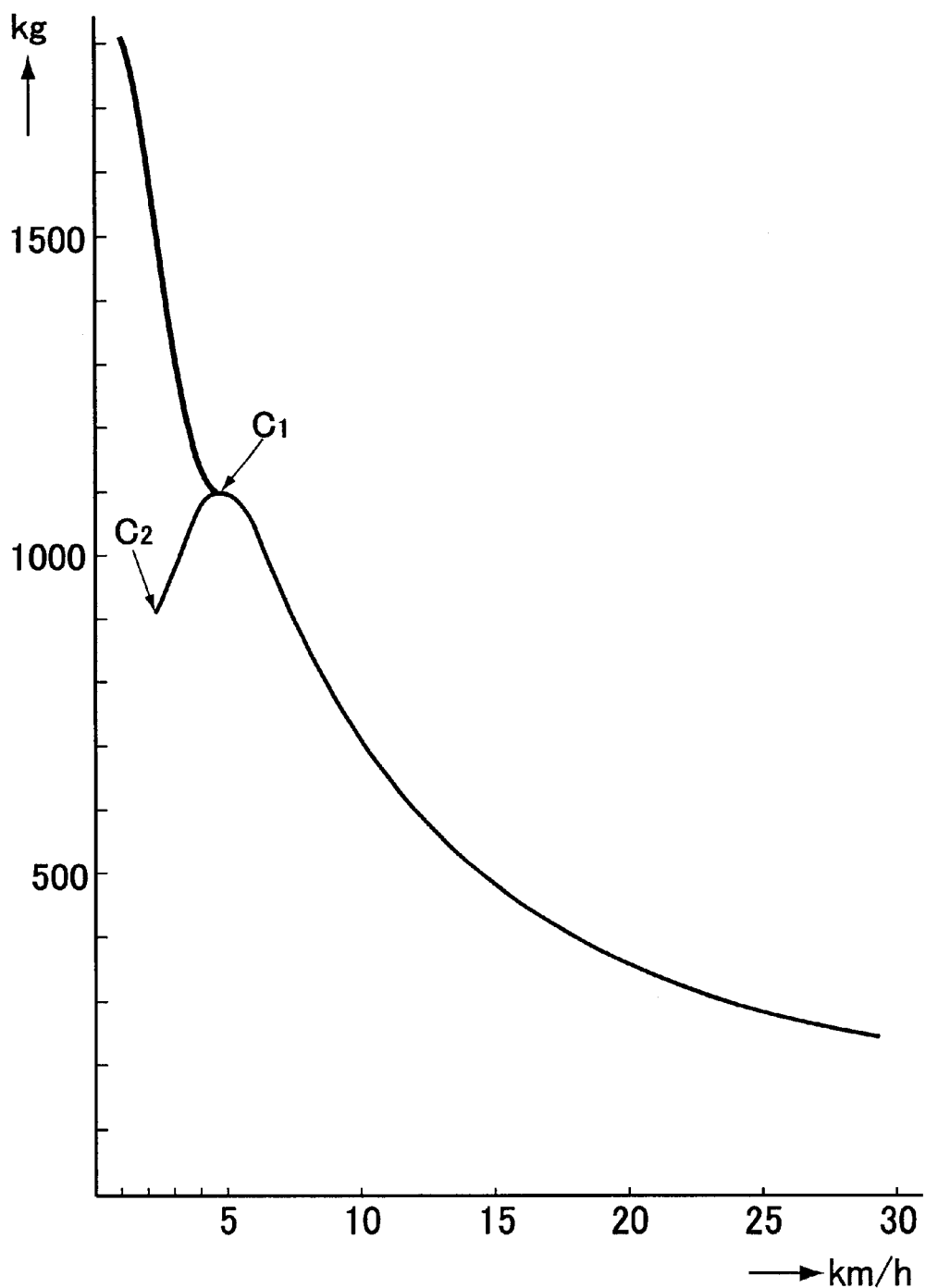
FIG. 5 is a power characteristics diagram showing a relationship between driving force and vehicle speed provided by an engine.

FIG. 5 is a power characteristics diagram showing relationships between the driving force of the vehicle and the vehicle speed provided by the engine 10 installed in the working vehicle. In FIG. 5, a thin line shows the driving force characteristics of the situation where the lock-up clutch 33 is engaged, and a bold line shows the driving force characteristics of the situation where the torque converter 12 is actuated after the lock-up clutch 33 is disengaged.

The driving force of the engine 10 reaches its maximum value at a vehicle speed of 4.5 km/h, which is a predetermined low travel speed C1, as shown by the thin line, and the driving force lowers even if the vehicle speed is lower than or higher than the speed shown here. However, the driving force can be increased even if the travel speed is at 4.5 km/h or below, when the torque converter 12 is actuated by disengaging the lock-up clutch 33. Therefore, from the start of a vehicle until it reaches the predetermined low travel speed, or a lock-up applying speed C1, the vehicle can be easily moved by actuating the torque converter 12 without causing the engine to stall or slipping the drive wheels.

When spraying the chemicals over turf grass, the pump 8 is driven by the drive unit 61 while the vehicle is traveling; however, when the pump 8 is driven while the torque converter 12 is being actuated, the number of revolutions of the working shaft 64 has no constant relationship with the vehicle speed. Therefore, the chemical spraying work is conducted by making the revolution of the working shaft 64 be in synchronization with the vehicle speed in a condition where the torque converter 12 is locked up after the vehicle has started and the lock-up applying speed C1 has been exceeded. Thereby, the rotation of the engine is transmitted with a higher response so that fuel consumption can be improved.

However, once the vehicle speed has increased up to the lock-up state, the engine stall does not occur even when the vehicle speed is lowered below the lock-up applying speed C1. Therefore, a speed which is lower than the lock-up applying speed C1 is set as a lock-up releasing speed, or work releasing speed C2. The speed is in the range of 2 to 3 km/h, and by setting the lock-up releasing speed C2 at a speed lower than the lock-up applying speed C1, chemical spraying work can be conducted even when the vehicle is made to travel at a low travel speed which is lower than the lock-up applying speed C1.

Figure 6:
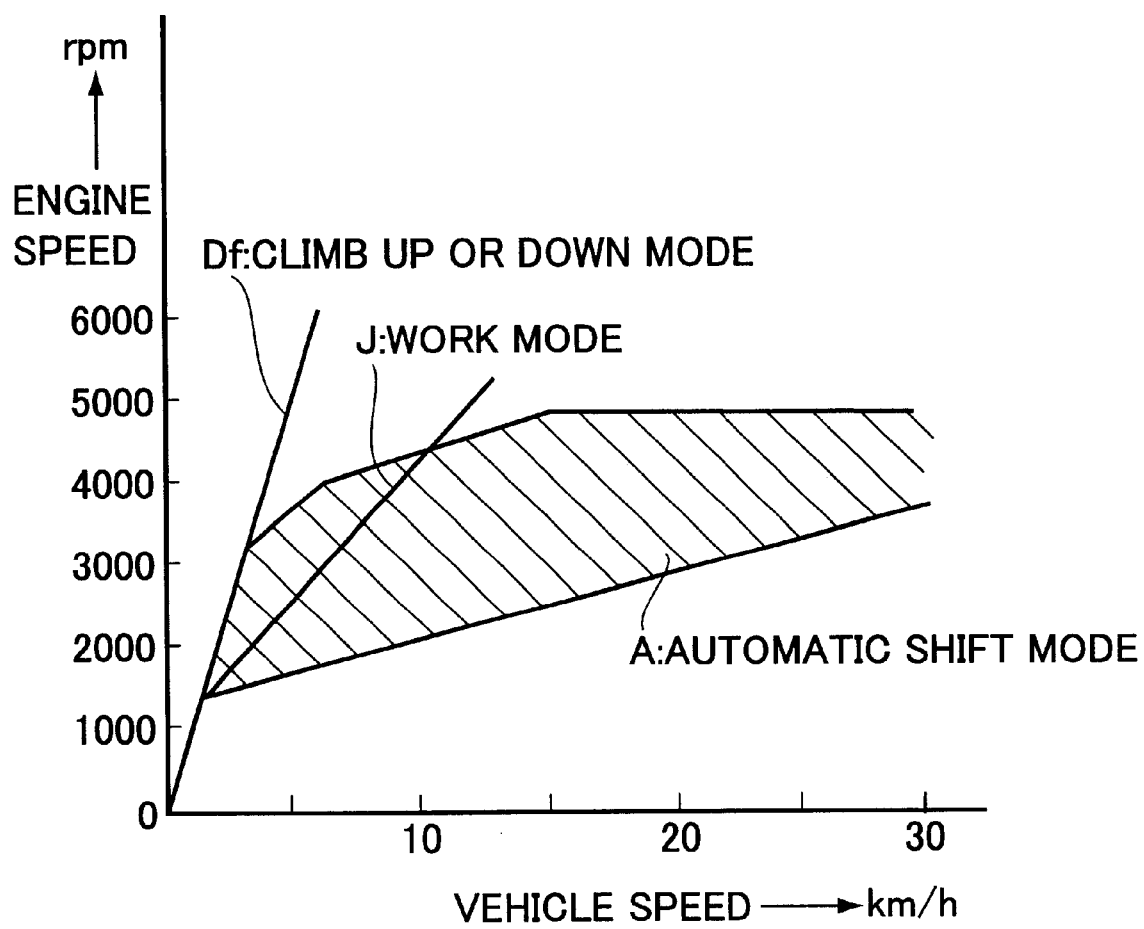
FIG. 6 is a shift characteristics diagram showing a relationship between engine speed and vehicle speed.

FIG. 6 is a shift characteristics diagram showing the relationship between the engine speed and the travel speed of the working vehicle with the continuously variable transmission 35. The continuously variable transmission 35 freely changes a transmission ratio in an automatic shift mode A which lies within the hatched area between a low speed stage at which the radius of the belt on the primary pulley 37 is at a minimum and a high speed stage at which the radius of the belt on the primary pulley 37 is at a maximum. Therefore, in the automatic shift mode A, a transmission ratio, or a pulley ratio, is automatically set at any value depending on the traveling condition of the vehicle, and so the traveling of the working vehicle being not in a spraying work state can be made at the most appropriate transmission ratio.

However, in the automatic shift mode A, the continuously variable transmission 35 voluntarily changes speeds depending on the throttle opening, the engine speed, and the vehicle speed, and thus the relationship between the engine speed, namely the rotational speed of the working machine, and the vehicle speed is not in a proportional relationship, so that a work such as chemicals spraying cannot be uniformly carried out in the automatic shift mode A while the vehicle speed is being changed.

Then, in order to lead a constant efficiency in the relationship with the vehicle speed in, for example, chemical spraying work conducted by driving the working shaft 64, it is necessary to set the work mode so as to enable the rotational speed of the working shaft 64 in a working range thereof to proportionally change in the relationship with the change of the vehicle speed as shown with the symbol J in FIG. 6. A change-speed line of the work mode J is set so as to enable the working vehicle to travel with a transmission ratio of the lowest stage until the vehicle speed thereof reaches a predetermined vehicle speed of the low speed range, and is set as a linear function having a predetermined slope, which represents a relationship between the rotational speed of the working shaft 64 (engine speed) and the vehicle speed, in the range over the predetermined vehicle speed, wherein the efficiency of each type of the works can be constantly kept at the most adequate value or required value in the relationship with the change of the vehicle speed. Thereby, the rotational speed of the working shaft 64 changes in synchronization with the vehicle speed, so that, in the work of, for example, chemicals spraying, the chemicals can be sprayed with a uniform spraying density per unit area even if the vehicle speed varies.

Moreover, the transmission ratio i is represented with a ratio between rotational speed Np of the primary shaft and rotational speed Ns of the secondary shaft ($i=Np/Ns$). When the torque converter 12 is locked up, the rotational speed Np of the primary shaft may be regarded to be the same as the engine speed Ne. In this case, the rotational speed Ns of the secondary shaft is represented as a function of the vehicle speed V ($Ns=V/K$, $K=\pi d/S$; wherein d is a diameter of tire, and S is a reduction ratio between the continuously variable transmission 35 and the driving wheels). As a result, the transmission ratio i is represented as a function between the engine speed Ne and the vehicle speed V ($i=K \cdot Ne/V$), and thus the continuously variable transmission 35 is controlled with the transmission ratio i for accomplishing the relationship between the engine speed Ne and the vehicle speed V in the work mode J. In such a way, the transmission ratio i is fixed to the lowest stage until the predetermined vehicle speed, and is inversely proportional against the vehicle speed V in the range over the predetermined vehicle speed.

Figure 8:
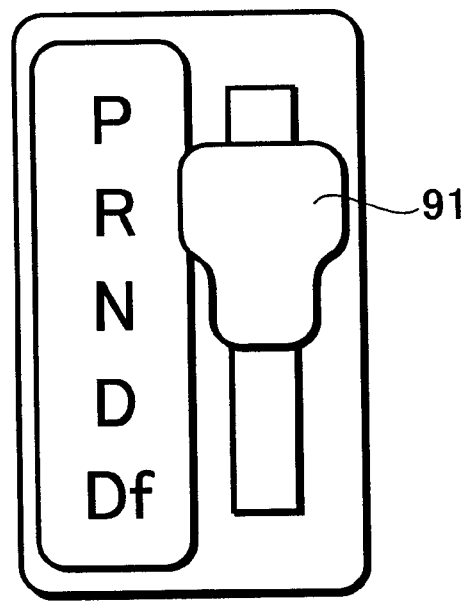
FIG. 8 is an explanatory view showing an arrangement of a sift lever.

On the other hand, the working vehicle of the present invention is further provided with a climb-up or down mode Df in order to maintain a climb-up performance at a stage of climbing up a slope and an engine-brake force at a stage of climbing down the slope. The climb-up or down mode Df is set by operating a shift lever (travel mode selecting means) 91 provided at an operator's seat. FIG. 8 is an explanatory view showing a structure of the shift lever 91. In FIG. 8, the mode Df is provided in addition to each mode of modes P, R, N and D. Moreover, the mode D conducts a transmission control with the automatic shift mode A. Also, the work mode J can be selected in the mode D, but basically not in the mode Df.

In the climb-up or down mode Df, the pulley ratio i of the continuously variable transmission 35 is fixed to a preset constant value. The pulley ratio i of the present embodiment is set at a maximum value in which the transmission ratio of the continuously variable transmission becomes maximum. Therefore, the transmission ratio does not change due to an accelerator opening at the stage of climbing up also, thereby enabling the working vehicle to climb up a slope at a high transmission ratio, that is, with a high engine speed within an are of no overspeed of the engine, and causing a stable travel of the working vehicle. Furthermore, since the high transmission ratio is maintained at the stage of climbing down the slope also as well as the climb-up stage, the engine-brake is sufficiently actuated, so that the increase of vehicle speed can be effectively prevented.

Figure 7:
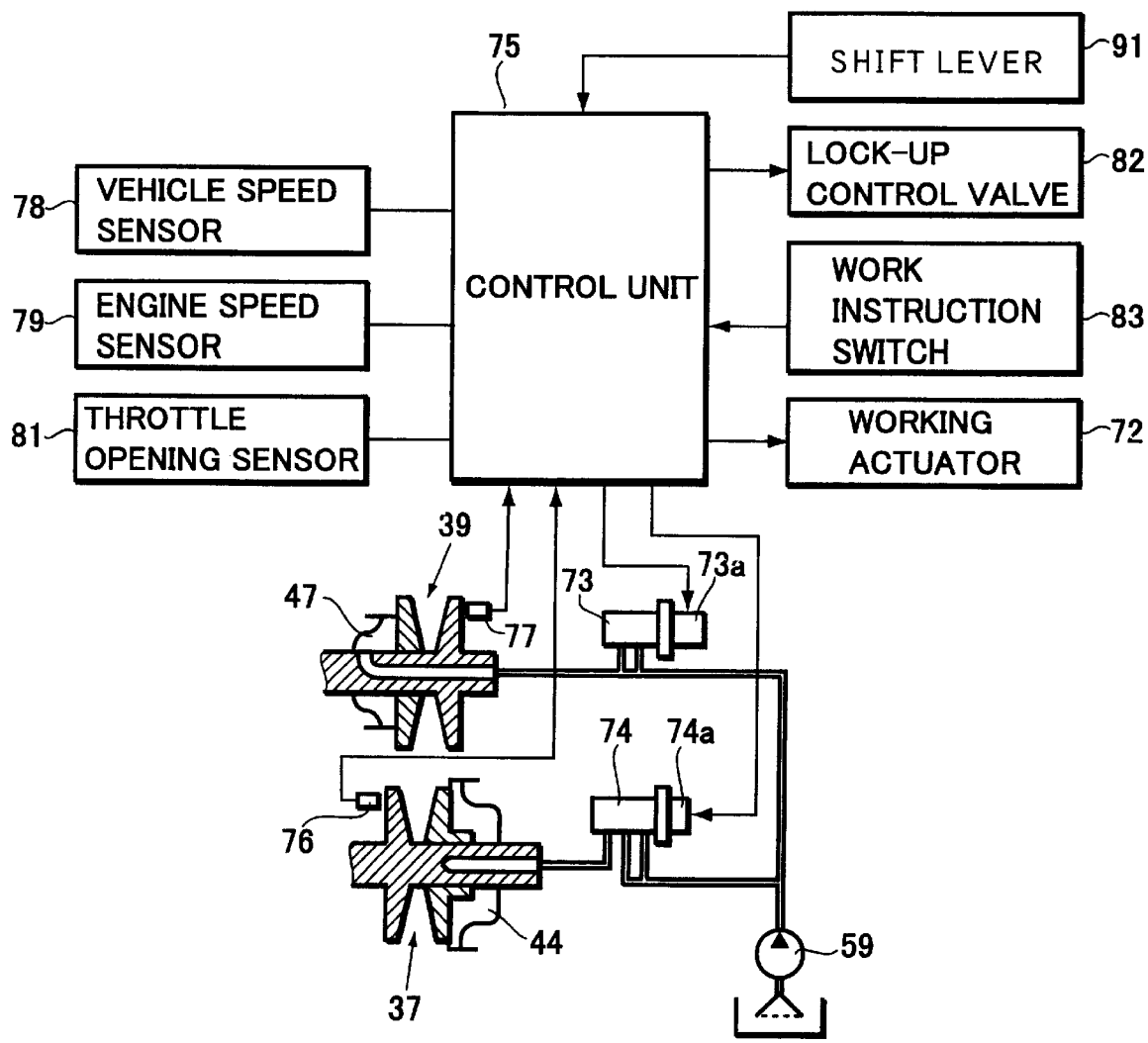
FIG. 7 is a block diagram showing the structure of a control system of an engine and a continuously variable transmission.

FIG. 7 is a block diagram showing a structure of shift control of the continuously variable transmission 35. The continuously variable transmission 35 is controlled by a control unit 75 which functions also as a transmission controller unit (TCU). As shown in FIG. 7, the discharge port of the hydraulic pump 59 driven by the crankshaft 15 is connected to a line pressure control valve 73 and a shift control valve 74. Discharge pressure from the hydraulic pump 59 is adjusted to a line pressure by the line pressure control valve 73, and the adjusted line pressure is supplied to a secondary oil chamber 47 as a secondary hydraulic pressure. The shift control valve 74 supplies a primary hydraulic pressure, obtained by adjusting the line pressure, to a primary oil chamber 44 to adjust the groove width of the primary pulley 37 so as to control the transmission ratio. An adequate tension according to the operating conditions is applied to the belt 41 by a secondary hydraulic pressure supplied into the secondary oil chamber 47.

Detection signals are sent to the control unit 75 from a primary-pulley rotational speed sensor 76 for detecting the number of revolutions of the primary pulley 37, and from a secondary-pulley rotational speed sensor 77 for detecting the number of revolutions of the secondary pulley 39. Furthermore, detection signals from a vehicle speed sensor 78, an engine speed sensor 79, a throttle opening sensor 81, and a shift lever 91 are sent to the control unit 75, and from the control unit 75 a changeover signal is sent to a lock-up control valve 82 provided for changing over the lock-up clutch 33 of the torque converter 12 between the lock-up engaged state and the lock-up disengaged state.

In addition, the control unit 75 is provided with memories such as ROM for storing data for the transmission ratios based on the travel conditions such as the vehicle speed in the automatic shift mode A, and the data for the fixed transmission ratios in the work mode J and a climb-up or down mode Df, and also the memories such as RAM for temporarily storing the variables necessary for executing a program. Furthermore, the control unit 75 is provided with a CPU, for computing control signals of the continuously variable transmission 35 based on the detected signals from each sensor and each travel mode.

Next, the operation of the working vehicle will now be described. The vehicle travels at the automatic shift mode A when the work such as the chemicals spraying is not carried out. In the other words, a voluntary transmission ratio within an area hatched in FIG. 6 is set without the steps according to signals from the vehicle speed sensor 78. Also, during the travelling state, the lock-up clutch 33 is automatically changed over based on the vehicle speed.

When the chemical spraying is carried out with the pump 8 driven by the working shaft 64, the changeover clutch 67 is set to a connection state by actuating the working actuator 72. For this purpose, a work instruction switch 83 for operating the working actuator 72 is provided at the operator's seat, and it is so arranged that a signal from the work instruction switch 83 is transmitted to the control unit 75.

Consequently, when the operator operates the work instruction switch 83 to start chemical spraying work while the vehicle is stopping or traveling, a signal is sent to the working actuator 72 and then the change clutch 67 is actuated. Thereby, the working shaft 64 is connected to the crankshaft 15 to drive the pump 8. On the other hand, the shift characteristics of the continuously variable transmission 35 is set with the work mode J, wherein the transmission ratio is arranged to be set along the predetermined change-speed line, namely so as to proportionally change the engine speed with the vehicle speed to drive the working vehicle.

In the work mode J, the rotational speed of the pump 8 is in synchronization with the engine speed, and also the vehicle speed varies in proportion to the engine speed. Therefore, even if the vehicle speed varies depending on the accelerator operation of the operator, the spraying amount of chemicals can be constantly kept per the unit area at a working area.

When the vehicle speed is at or below the work releasing speed C2 during the spraying work, a control signal is sent to the working actuator 72, and the connection between the working shaft 64 and the crankshaft 15 is disconnected by the changeover clutch 67 to stop the operation of the pump 8. By providing at the operator's seat an indicator lamp which indicates whether the pump 8 is in the operating state or in the non-operating state, the operator can visually discern the state of the pump 8.

On the other hand, when traveling a slope for conducting turf grass management work at an inclined area, the working vehicle of the present invention can travel with the climb-up or down mode through selecting the mode Df by the shift lever 91. In the mode Df, the control unit 75 controls the continuously variable transmission 35 with the maximum transmission ratio based on the signal from the shift lever 91. In other words, a control signal is sent from the control unit 75 to a solenoid 73a of the line pressure control valve 73 and a solenoid 74a of the shift control valve 74, so that the pulley ratio i is set at a maximum valve.

Figure 9:
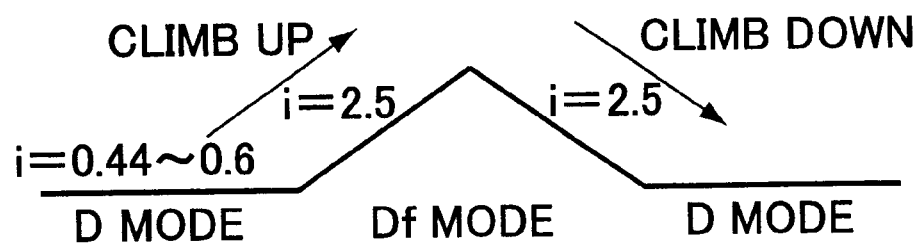
FIG. 9 is an explanatory view showing variation of pulley ratio according to a changeover of a travel mode.

Specifically, a driver selects the climb-up or down mode through a changeover of the shift lever 91 when coming near a slope. Them, as shown in FIG. 9, the travel on a flat road is controlled with the pulley ratio i, which is, for example, 0.44–0.6 under the mode D, and further the travel along a slope is controlled with the maximum pulley ratio i, which is, for example, 2.5. Thereby, a large climb-up performance can be obtained at a stage of climbing up a slope, a large engine-brake force being obtained at a stage of climbing down a slope. As a result, when climbing up, the drive ability can be improved, and also when climbing down, the over-speed can be prevented, so that the security of travel is not only increased, but also tearing turf out as caused by a quick operation of a foot-brake device can be prevented. Moreover, in the mode Df also, the relationship between the engine speed and the vehicle speed is kept to be proportional, so that the uniformity of work is not lost also is the work at an inclined area.

After descending a downward slope with the engine brake, an operator changes the travel mode over from the mode Df to the mode D by the shift lever 91. Hereby, the working vehicle travels at a normal mode D, and the transmission ratio is controlled based on the automatic shift mode A.

(Second Embodiment)

Next, the working vehicle of the second embodiment of the present invention will be explained hereinafter. Moreover, since the basic structure of the working vehicle of the second embodiment is the same as that of the first embodiment, the same reference numeral will be given to the same parts, an explanation of which will be omitted.

The working vehicle of the second embodiment automatically detects whether the vehicle is traveling along a slope, and, if so, sets the pulley ratio (transmission ratio) i to a preset value (for example, the climb-up or down mode Df in FIG. 6) so as to increase the climb-up performance at a stage of climbing up the slope and an engine-brake force at a stage of climbing down the slope. That is, the control unit 75 functions as climb-up or down detecting means for detecting whether the vehicle is during the climbing up or down stage, and also as transmission ratio setting means for setting the pulley ratio i when coming near the climbing up or down stage.

In this case, the control unit 75 detects the vehicle traveling condition through the engine load and the acceleration of vehicle. Specifically, the accelerator opening is obtained from the throttle opening sensor 81, and a present vehicle speed is obtained from the vehicle speed sensor 78, the acceleration of vehicle being calculated based on the both data. These data are already existing ones showing the driving condition of vehicle, and so no addition of parts is needed for recognizing the driving condition of vehicle. In such a way, the control unit 75 determines that the working vehicle is at the stage of climbing up the slope when the accelerator opening is at or above a predetermined value, and the acceleration is at or below a predetermined value. Contrary to this, the control unit 75 determines that the working vehicle is at the stage of climbing down the slope when the accelerator opening is at or below the predetermined value, and the acceleration is at or above the predetermined value.

When a position of vehicle is determined at the stage of climbing up or down, the control unit 75 sets the transmission ratio of the continuously variable transmission 35 at a maximum value. Specifically, a control signal is sent from the control unit 75 to the solenoid 73a of the line pressure control valve 73 and the solenoid 74a of the shift control valve 74, so that the pulley ratio is controlled at a maximum value.

In such a way, when the working vehicle approaches an ascent, and then the vehicle speed starts to lower even if the accelerator is depressed, the control unit 75 determines that the vehicle is climbing up the slope to set the pulley ratio at a maximum value. That is, as shown in FIG. 9, although the travel on a flat road is controlled with the pulley ratio i, which is, for example, 0.44–0.6 under the mode D, further the travel along a slope is controlled with the maximum pulley ratio i, which is, for example, 2.5. Thereby, the transmission ratio at the stage of climbing up is not varied based on the accelerator opening, so that the vehicle can climb up with a high transmission ratio and also a high engine speed. As a result, the drive ability at the stage of climbing up can be improved.

On the other hand, at a downward slope, in general, the vehicle speed increases even if an operation of the accelerator is released. When detecting the condition, the control unit 75 determines that the vehicle is at the stage of climb-down to set the pulley ration at a maximum value. Thereby, since the large engine-brake force is obtained, the vehicle can safely climb down the downward slope without frequently operating the foot-brake device. Consequently, the overspeed at the stage of climb-down and also the injury of turf grass due to a quick operation of the foot-brake device can be prevented, so that a safety performance of the working vehicle can be improved.

When thus climbing down on the downward slope with engine brake, the relationship between the accelerator opening and acceleration returns to that of the normal travel mode, wherein the travel mode is changed over from the mode Df to the mode D, and the transmission ratio is controlled based on the automatic shift mode A as shown in FIG. 9.

(Third Embodiment)

Figure 10:
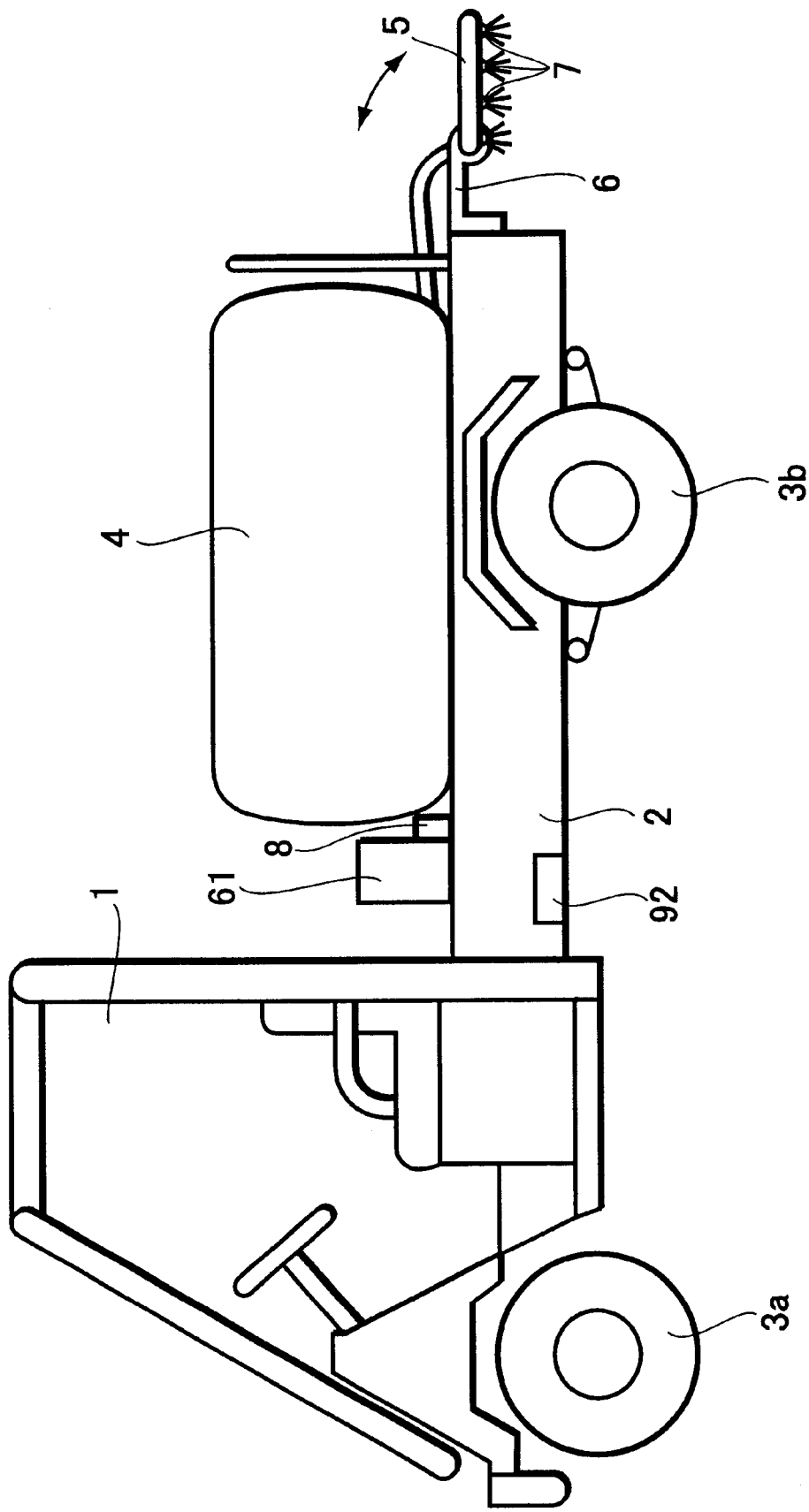
FIG. 10 is a side view showing the working vehicle of the third embodiment of the present invention.
Figure 11:
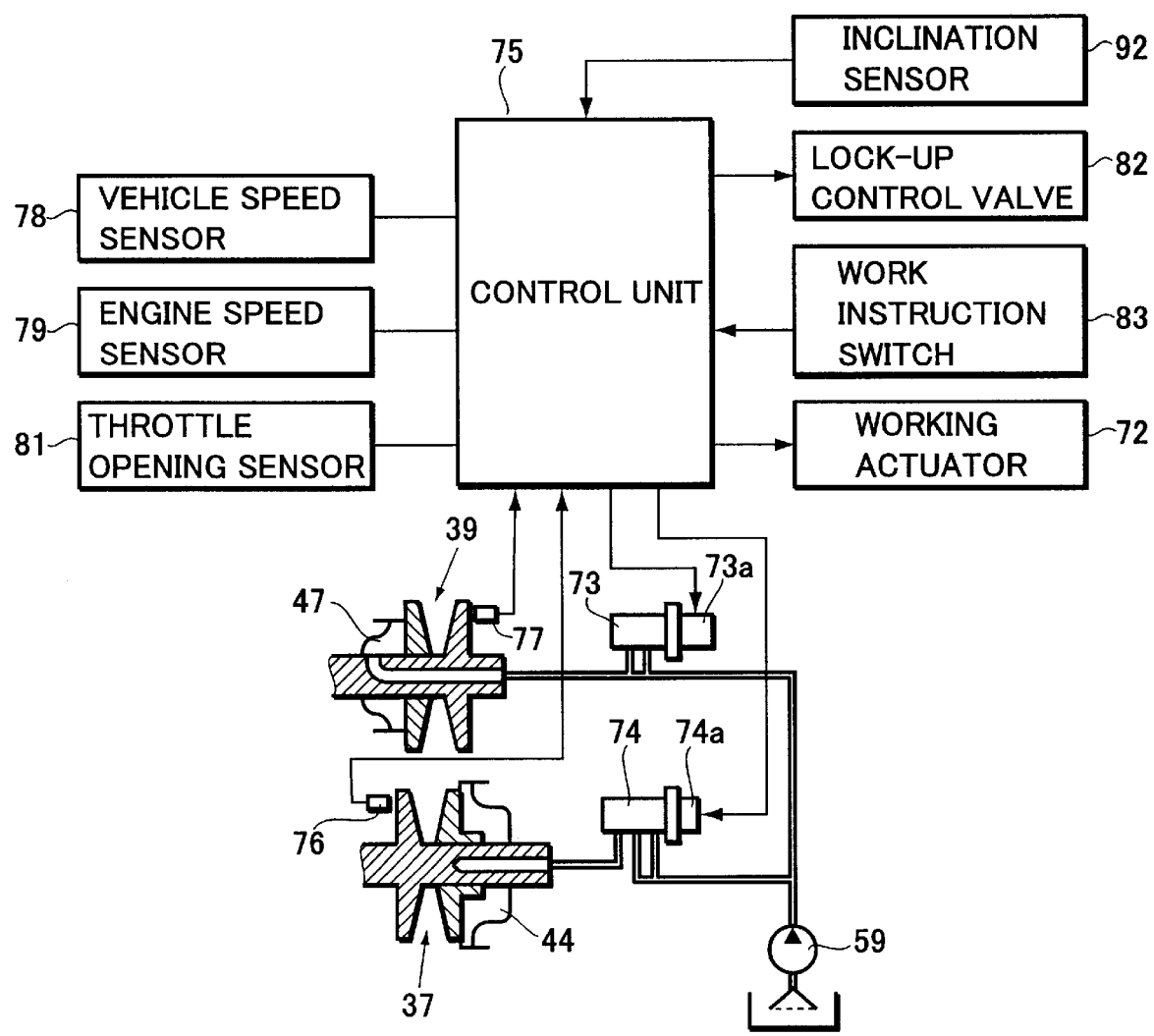
FIG. 11 is a block diagram showing the structure of a control system of an engine and a continuously variable transmission in the working vehicle of FIG. 10.

Furthermore, the working vehicle of the third embodiment of the present invention will be explained, which automatically detects an inclination of the vehicle and then automatically changes the travel mode over. FIG. 10 is a side view showing the working vehicle as the third embodiment of the present invention. Also, FIG. 11 is a block diagram showing a structure of a shift control circuit for the working vehicle of FIG. 10. Moreover, almost all of the structure of the working vehicle in FIG. 10 is the same as that of the first embodiment, and thus the same reference numeral is fitted to the same portion, respectively, each explanation thereof being omitted.

As shown in FIG. 10, an inclination sensor 92 as climb-up or down detecting means is mounted at a substantially central portion of the working vehicle of the present embodiment. The inclination sensor 92 comprises an inclinometer employing a potentiometer or mercury, detected data (inclined amount of vehicle) of which is sent to the control unit 75. The control unit 75 compares the inclined amount of vehicle as detected by the inclination sensor 92 with a preset threshold value. When the absolute value of the detected value is at or above the predetermined value, it is determined that the vehicle is at the stage of climb-up or down. Moreover, either climb-up or climb-down is determined through, for example, indicating the inclined amount of vehicle with positive and negative, in which a horizontal condition thereof is indicated as zero.

In such a way, the vehicle traveling condition is determined, and then the control unit 75 sets the climb-up or down mode Df as mentioned above, and sets the transmission ratio at a maximum value when the vehicle is at the stage of climb-up or down. Thereby, the climb-up force and the engine-brake force is ensured, so that an improvement of drive ability and security in traveling along a slope can be accomplished, and a good condition of turf grass can be kept. Also, in the present embodiment, the inclination sensor 92 directly detects the inclined amount of vehicle to control the transmission ratio, and then it is possible to quickly conduct a changeover to the climb-up or down mode without influence of unsteady accelerator operation by an operator.

The present invention is not limited to the embodiments described above, and it will be obvious to those skilled in the art that various changes and modifications may be made without departing from the spirit of the invention.

For example, in order to constantly keep the engine speed independently of the load fluctuation applied to the vehicle, the mechanical type engine governor device is provided on the working vehicle as shown in FIG. 2. However, by using a fuel injection type of engine, the engine speed may be constantly kept through controlling the injection amount of fuel.

Figure 12:
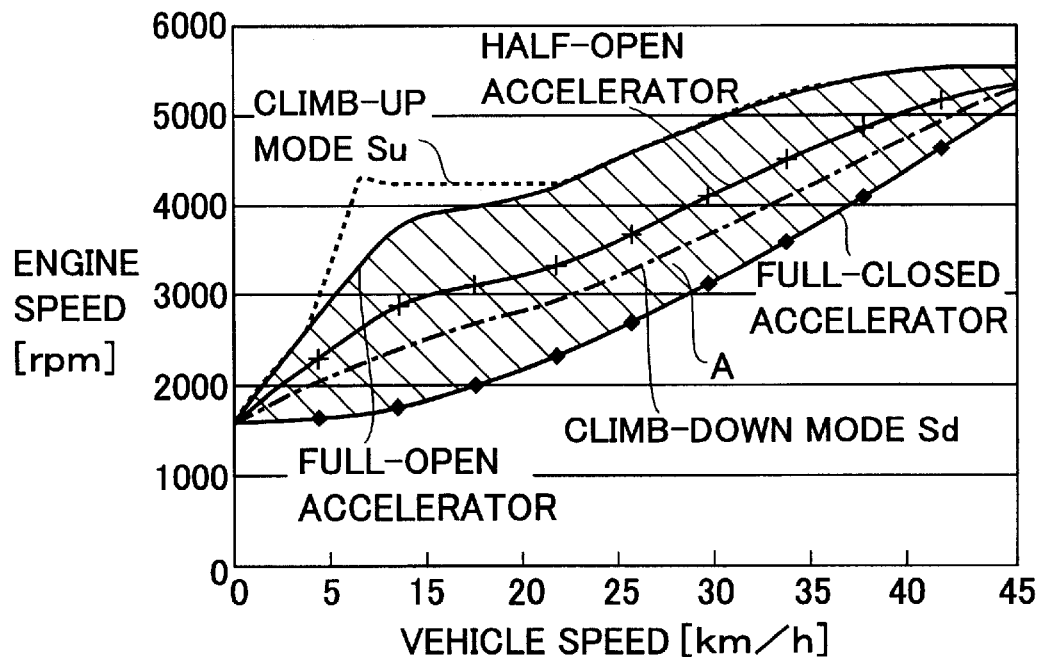
Figure 12:
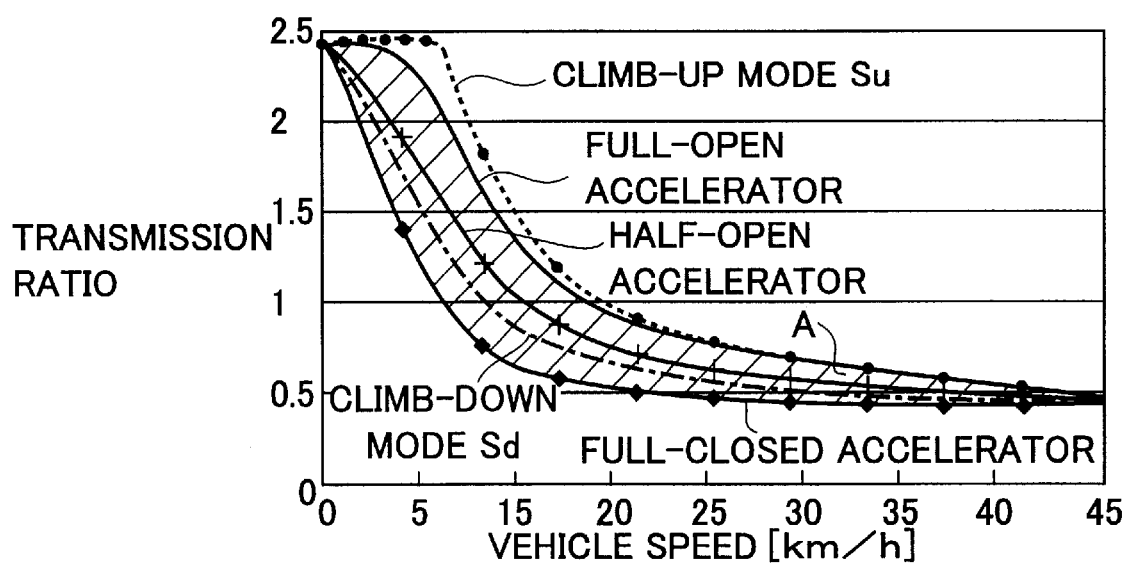

In addition, a shift characteristic as shown in FIG. 6 is just one example, which is not limited to that as shown in Figure. For example, although the both climb-up mode and climb-down mode is controlled with the same mode Df in FIG. 6, a transmission ratio of which is fixed to a low stage, it is possible to alter a control condition between climbing up a slope and climbing down it. FIG. 12a is a shift characteristic diagram showing one modified example of the climb-up or down mode, wherein the control unit 75 has a normal control table A, a climb-up control table Su and a climb-down control table Sd. Here, the climb-up control table Su has a characteristic which is near that of the lowest stage, and also the climb-down control table Sd has a characteristic which is near that of a half open condition of the accelerator. Each transmission ratio of the modes in FIG. 12a is also altered as shown in a table of FIG. 12b. Moreover, the claimed wording, "controlling a transmission ratio of said automatic transmission with transmission ratios unique to a climb-up mode or a climb-down mode" is a conception including characteristics as shown in FIG. 12. In other words, the transmission ratio of the present invention is not limited to just one fixed transmission ratio.

According to the present invention, the mode Df for fixing the transmission ratio at a predetermined value is provided. By manually selecting the mode Df or automatically changing over to it with the climb-up or down detecting means when the working vehicle is on a slope, the working vehicle can climb up the slope maintaining its stability with the engine speed adequately kept during climbing up or down the slope. Further, while climbing down the slope also, the stable engine-brake force can be obtained, so that the overspeed due to a downward slope can be prevented. Therefore, the safety at the stage of climb-down can be improved, and also the injury of turf grass due to the quick operation of the foot-brake device can be prevented.

Further, since the mode Df of the present invention sets the transmission ratio at a maximum value, the vehicle can climb up with the high engine speed, and climb down with the large engine-brake force.

While there have been described what are at present considered to be preferred embodiments of the present invention, as already mentioned above, it will be understood that various modifications may be made thereto, and it is intended that the appended claims cover all such modifications as fall within the true spirit and scope of the invention.

What is claimed is:

1. A working vehicle having a working machine, comprising:
   an engine;
   an automatic transmission for transmitting a power of said engine to wheels; and
   control means for controlling a transmission ratio of said automatic transmission to a ratio unique to a climb-up mode or a climb-down mode when said control means determines that the working vehicle is in the climb-up mode or the climb-down mode, wherein said control means is adapted to determine both the climb-up mode and the climb-down mode.

2. The working vehicle according to claim 1, wherein said control means controls said transmission ratio of the automatic transmission at a maximum value when it is determined that the working vehicle is in the climb-up mode or the climb-down mode.

3. The working vehicle according to claim 1, wherein said control means controls the transmission ratio of said automatic transmission through a normal control table when determining that the working vehicle is in a normal travel mode, and through a climb-up control table or a climb-down control table when determining that the working vehicle is in a climb-up mode or a climb-down mode, respectively.

4. The working vehicle according to claim 1, wherein said control means determines that the working vehicle is in either the climb-up mode or the climb-down mode when said control means detects that a shift lever is changed over to a predetermined position.

5. The working vehicle according to claim 1, wherein said control means determines that the working vehicle is in the climb-up mode when an accelerator opening is at or above a predetermined value, and an acceleration of the working vehicle is at or below a predetermined value.

6. The working vehicle according to claim 1, wherein said control means determines that the working vehicle is in the climb-down mode when an accelerator opening is at or below a first predetermined value, and the acceleration of the working vehicle is at or above a second predetermined value.

7. The working vehicle according to claim 1, wherein said control means determines that the working vehicle is in the climb-up mode or the climb-down mode when an absolute value of an inclined angle of the working vehicle as detected by an inclination sensor is at or above a predetermined value.

8. The working vehicle according to claim 1, wherein said automatic transmission is a continuously variable transmission.

9. A working vehicle comprising:
   an engine;
   an automatic transmission coupled to the engine and transmits power from the engine to wheels of the vehicle; and
   a controller that sets a ratio of the automatic transmission to a ratio which is unique to a climb-up mode and a climb-down mode, wherein the controller is adapted to determine both a climb-up mode and a climb-down mode.

10. The vehicle of claim 9, wherein the controller sets the ratio of the automatic transmission to a ratio which is unique to both of the climb-up mode and the climb-down mode.

11. The vehicle of claim 9, wherein the controller sets the ratio of the automatic transmission to a maximum ratio in response to a determination of either of the climb-up mode and the climb-down mode.

12. The vehicle of claim 9, wherein the controller is further adapted to determine a normal mode and further controls the ratio of the transmission through a normal control table in response to a determination of the normal mode.

13. The vehicle of claim 9, wherein the controller controls the ratio of the transmission based upon one of a climb-up control table and a climb-down control table based upon a determination as to whether the vehicle is in the climb-up mode or the climb-down mode, respectively.

14. The vehicle of claim 9, further comprising a shift lever for the transmission which includes a predetermined position that indicates one of the climb-up mode and the climb-down mode.

15. The vehicle of claim 14, wherein the controller determines whether the vehicle is in one of the climb-up mode and the climb-down mode based upon the shift lever positioned at the predetermined position.

16. The vehicle of claim 9, wherein the controller determines whether the vehicle is in one of the climb-up mode and the climb-down mode based upon a accelerator signal from an accelerator of the vehicle exceeding a first predetermined value and an acceleration of the vehicle being at or below a second predetermined value.

17. The vehicle of claim 9, further comprising an inclination sensor that generates an inclination signal, wherein said controller determines said climb-up mode and said climb-down mode based upon said inclination signal.

18. The vehicle of claim 17, wherein the controller determines whether the vehicle is in one of the climb-up mode and the climb-down mode based upon the inclination signal.

19. The vehicle of claim 9, wherein the automatic transmission comprises a continuously variable transmission.

* * * * *